2,838,480

SEPARATION OF MIXED FATTY ACIDS

Daniel Swern and Winfred Evans Parker, Philadelphia, Pa., assignors to the United States of America as represented by the Secretary of Agriculture No Drawing. Application July 14, 1952
Serial No. 298,879

4 Claims. (Cl. 260—96.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to processes for the separation of mixed fatty acids.

An object of the invention is to provide processes for concentrating and purifying the oleic acid in the mixed fatty acids obtainable from animal and vegetable fats and oils. Another object is to provide processes for removing saturated and polyunsaturated fatty acids from admixture with oleic acid. Another object is to provide a commercially practical process for producing oleic acid in high purity and of good color and color- and odor-stability.

Many processes have been described for isolating oleic acid from mixed fatty acids. Stepwise precipitation with urea wherein the saturated acids are precipitated first and the oleic acid second, leaving the polyunsaturated acids as a filtrate fraction, has been proposed. The method is commercially impractical, however, because (1) the amount of urea required is excessive and (2) the separation between the oleic and the saturated acids is poor.

Fractional crystallization has been used to purify oleic acid. The very low temperature required (—40 to —90° C.) makes this method commercially impractical.

Fractional distillation is one of the oldest ways of separating fatty acids. It is not a practical method for producing pure oleic acid because the boiling points of stearic, oleic, linoleic and and linolenic acids are all very close together and effective separation requires very efficient (and very expensive) stills. Also, the high temperatures and long times required cause a great deal of isomerization and polymerization of the unsaturated acids.

We have now discovered that the disadvantages of prior processes can be avoided and high grade oleic acids can be produced economically by a process comprising a unique combination of crystallization, urea complex formation and fractional distillation. In order to achieve maximum purification of oleic acid at minimum cost, the three steps must be carried out in the order named and in the manner hereinafter described.

Our process is applicable to the production of high grade oleic acid from red oil or mixed acids from edible and inedible tallow, greases, lard, pork fat, mutton fat, olive oil, cottonseed oil, almond oil, pecan oil, peanut oil, soybean oil, and, in general, any selectively hydrogenated or unhydrogenated animal or vegetable fat in which the ratio of oleic acid to polyunsaturated acids is at least 3:1.

In the operation of our process, the crude mixed fatty acids are dissolved in a solvent consisting of about 90% methanol and 10% water; the solution is cooled to about 0° C., thus causing crystallization of a large part of the saturated acids, particularly, stearic acid; to the filtrate is added sufficient urea to form complexes with the mono-unsaturated and remaining saturated acids present, and the crystalline complexes formed are filtered off; finally, the acids recovered from the complexes are distilled to remove color and to separate the palmitic and other shorter-chain acids from the oleic acid. The product is high grade oleic acid generally of 90% purity or better, and of good color and color- and odor-stability.

In contrast to other processes, our process does not produce appreciable elaidic acid (the trans-isomer of oleic acid) nor does it entail loss of the polyunsaturated acids. The latter are obtained in highly concentrated form and are valuable for the production of drying oils and for the upgrading of semi-drying oils.

Example I

A mixture of fatty acids was prepared to simulate the mixture obtained from commercial inedible tallow or grease. It consisted of

|               | Percent |
|---------------|---------|
| Stearic acid  | 15      |
| Palmitic acid | 30      |
| Myristic acid | 3       |
| Oleic acid    | 45      |
| Linoleic acid | 7       |

Twenty grams of this mixture was dissolved in 100 ml. of 90% methanol-10% water mixture. The solution was cooled to 0° C. and 8.4 g. of crystalline fatty acids of M. P. 54–55° C. and iodine No. 1.7 were removed by filtration. This material corresponded to triple-pressed stearic acid. To the filtrate was added 45 g. of urea and the mixture was heated until the urea dissolved. Upon cooling to room temperature 33 g. of solid urea complexes were recovered by filtration. Addition of warm water to the complex liberated 8.2 g. of colorless liquid acids of iodine No. 73 (composition: 78% oleic acid, 20% saturated acids and 2% linoleic acid). The yield of oleic acid precipitated as complex was 70%. The filtrate from the urea complex was evaporated nearly to dryness, warm water was added to dissolve the urea present and the liquid acids were extracted from the aqueous solution with ether. Evaporation of the ether yielded 3.4 g. of oil of iodine No. 121 (composition: 48% linoleic acid, 37% oleic acid and 15% saturated acids).

Distillation of the acids obtained by precipitation as the urea complex showed that most of the saturated acid present was palmitic acid; this was easily separated by distillation and the oleic acid was obtained in better than 90% purity.

Example II

The material used was a commercial, straight-run distilled prime tallow fatty acids mixture having the following composition: 53.2% oleic acid, 40.7% saturated acids and 6.1% polyunsaturated acids. One kilogram of the material was dissolved in 4 l. of 90% methanol and the solution was cooled to 0° C. By filtration, 429 g. of solid acids having iodine No. 4.2 was removed. To the filtrate was added 2550 g. of urea (5 g. per g. of oleic and saturated acids). After warming to dissolve the urea, the solution was allowed to cool to room temperature and 1960 g. of crystallized complexes were removed by filtration. Addition of warm water to the complexes yielded 495 g. of pale yellow, liquid fatty acids having iodine No. 79 (composition: 83% oleic acid, 15% saturated acids and 2% polyunsaturated acids). The yield of oleic acid to this point was 77%.

Fractional distillation through a column equivalent to 10 theoretical plates yielded 259 g. of purified oleic acid of iodine No. 85.1 and $n_D^{30}$ 1.4563 (composition: 90% oleic acid, 7.7% saturated acids and 2.3% polyunsaturated acids). The yield of oleic acid was 45%. The lower fractions from the distillation weighed 198 g. and had an iodine number of 62. They could be recycled in the process to increase the yield of oleic acid or they could be used in preparing high grade soaps or in other applications.

The filtrate from the urea complex crystallization was evaporated almost to dryness and warm water was added to dissolve the urea. The oily layer was extracted with petroleum naphtha (hexane fraction). Evaporation of the solvent under nitrogen in vacuum yielded 87 g. of brown liquid of iodine number 131, which consisted of a concentrate of linoleic acid.

*Example III*

Separation of commercial brown grease fatty acids.— These were darkly colored and had the following composition: 48.1% oleic acid, 48.0% saturated acids, 3.9% polyunsaturated acids. As described under Example II, 543 g. of saturated acids was obtained by crystallization of 1000 g. of brown grease fatty acids from 90% methanol at 0°.

Addition of 2100 g. of urea to the filtrate yielded 1514 g. of urea complexes from which 358 g. of liquid fatty acids, iodine number 68, was obtained as described. Straight-run distillation yielded 341 g. of straw-yellow acids, iodine No. 65.3 (composition: 69% oleic acid, 29% saturated acids, 2% polyunsaturated acids). Fractional distillation yielded 145 g. of straw-yellow liquid acids, B. P. 201–205°/3.5–4.0 mm. and iodine No. 81.8 (composition: 87% oleic acid, 11% saturated acids, 2% polyunsaturated acids). The yield of oleic acid was 26%. The lower fraction from the distillation weighed 196 g. and had an iodine number of 53. This could be recycled in the process to increase the yield of oleic acid.

The polyunsaturated acid fraction, isolated from the urea complex filtrate, weighed 94 g. and had an iodine number of 105.

*Example IV*

Separation of commercial hydrolyzed inedible tallow.— These fatty acids were obtained directly from a commercial Twitchell hydrolysis operation and they were dark brown in color. Mineral acid was removed by three hot water washes, but the fatty acids were not distilled.

From 1000 g. of fatty acids 325 g. of saturated acids, iodine No. 10.2, was obtained by crystallization from 90% methanol at 0° as described in Example II. From 1546 g. of urea complexes, prepared as already described in Example II, 390 g. of dark-brown liquid acids, iodine No. 76.1, was isolated. Straight-run distillation yielded 298 g. of yellow-brown acids, iodine No. 77.6, and a substantial tarry still residue. Fractional distillation in a 10 plate column yielded 145 g. (26% yield) of oleic acid, iodine No. 89.7 (composition: 95% oleic acid, 3% saturated acids, 2% polyunsaturated acids), and 153 g. of lower fraction, iodine No. 66, which could be recycled.

When hot water was added to the filtrate from the urea complex separation after evaporation of methanol, an emulsion was obtained which could not be completely broken by the addition of salt. The mixture was extracted with commercial hexane, the lower milky aqueous layer was discarded, and the polyunsaturated acids were isolated from the solvent as already described. The polyunsaturated acid fraction weighed 38 g. and had an iodine number of 127.

*Example V*

Separation of single-distilled commercial oleic acid (red oil).—This product was a dark brown liquid prepared commercially by hot pressing of single-distilled fatty acids obtained by the Twitchell hydrolysis of inedible tallow and grease. The composition of the red oil, iodine No. 92, was 70% oleic acid, 15% saturated acids and 15% polyunsaturated acids. Because of the low content of saturated acids, the usual crystallization at 0° C. was omitted. One thousand grams of red oil was dissolved in a boiling solution of 4250 g. of urea (5 g. of urea per gram of oleic plus saturated acids) in 10 l. of 90% methanol. Urea complexes formed immediately on cooling. The mixture was allowed to cool to room temperature and filtered, yielding 2727 g. of urea complexes. Addition of warm water to the complex to dissolve the urea yielded a pale-yellow insoluble oil which weighed 682 g., iodine No. 73.7. Straight-run distillation yielded 630 g. of colorless liquid, iodine No. 79.2 (composition: 84% oleic acid, 14% saturated acids, 2% polyunsaturated acids). Yield of oleic acid recovered, 76%. Fractional distillation in a 10 plate column yielded 448 g. of colorless liquid, iodine No. 87.4 (composition: 91% oleic acid, 6% saturated acids, 3% polyunsaturated acids). Yield of oleic acid recovered, 58%. The lower fraction from this distillation weighed 182 g. and had an iodine number of 59. It could be recycled.

The filtrate from the urea complex separation was worked up in the usual way yielding 222 g. of dark-colored liquid, consisting of linoleic acid concentrate, iodine No. 132.

*Example VI*

Separation of double-distilled commercial oleic acid.— This product (composition: 70% oleic acid, 15% saturated acids, 15% polyunsaturated acids) was straw-yellow and was prepared commercial by a straight-run distillation of the single-distilled commercial oleic acid described in the preceding example. From 1000 g. dissolved in 10 l. of 90% methanol, 2800 g. of urea complexes was obtained (4250 g. of urea employed). These yielded 735 g. of colorless liquid, iodine No. 79.8 (composition: 84% oleic acid, 14% saturated acids, 2% polyunsaturated acids). Yield of oleic acid recovered, 88%. Fractional distillation in a 10 plate column yielded 452 g. of colorless liquid, B. P. 206°/4 and iodine No. 86.7 (composition: 90% oleic acid, 7% saturated acids, 3% polyunsaturated acids). Yield of oleic acid recovered, 58%. The lower fraction from this distillation weighed 212 g. and had an iodine number of 62. It could be recycled.

The filtrate from the urea complex separation was a yellow oil, consisting of a linoleic acid concentrate, which weighed 244 g., iodine No. 136.

It should be noted that in Examples V and VI, despite the low saturated acid content of the starting material, the omission of the first step in our process, the 0° C. crystallization of saturated acids, greatly increased the amount of urea required in the next step. The disadvantage of omitting the first step is even greater when working with crude acids containing higher percentages of saturated acids.

While we consider that the greatest utility of our process is in the separation of mixed fatty acids, and all the examples shown are for the separation of fatty acids, our process is also applicable to the separation of esters of fatty acids, particularly the methyl esters, and the separation of fatty alcohols and their esters. By fatty alcohols we mean the long chain alcohols obtained by the hydrogenation of fats, for example, stearyl, myristyl, dodecyl, oleyl, linoleyl and similar alcohols. In all these cases our three step process functions basically as it does with fatty acids. First, the saturated components are largely removed by crystallization at about 0° C. Second, the remaining saturated and the monounsaturated components are crystallized together as the urea complexes; and third, the components recovered from the urea complexes are fractionally distilled for final purification. The polyunsaturated components are left in concentrated form in the material recovered from the filtrate from which the urea complexes were removed.

In all these cases the distillation step is made much more effective than it is in conventional processes by the fact that in the first step of the process the longer-chain ($C_{18}$) saturated components are removed almost completely, and the saturated compounds found in the urea complexes in our second step are predominantly the shorter-chain ones ($C_{12}$ to $C_{16}$). These are readily separated from $C_{18}$ monounsaturated compounds by distillation, whereas separation of $C_{18}$ saturated compounds by distillation is practically impossible.

We claim:

1. A process for separating monounsaturated fatty acids from mixtures of fatty acids containing saturated, mono- and polyunsaturated fatty acids in which the ratio of mono- to polyunsaturated acids is at least 3:1 which comprises the following sequence of steps: dissolving the mixture of acids in a solvent comprising 90% methanol and 10% water; cooling the solution to about 0° C. to precipitate most of the saturated acids as a solid; separating the supernatant liquid containing mixed unsaturated acids and residual saturated acids from the precipitate of saturated acids; dissolving, by the application of heat, sufficient urea in the separated solution to form complexes with the monounsaturated acids and remaining saturated acids; cooling the solution to about 25° C. to cause crystallization of said complexes; separating the crystals of complexes from the supernatant solution containing the polyunsaturated acids. recovering a mixture of saturated and monounsaturated fatty acids from the crystalline complexes by the addition of hot water; and separating and recovering the monounsaturated acids from the saturated fatty acids by fractional distillation.

2. The process of claim 1 wherein the mixed fatty acids are the mixed acids obtained by the hydrolysis of inedible animal fat.

3. The process of claim 1 wherein the mixed fatty acids are those found in red oil.

4. The process of claim 1 wherein the mixed fatty acids are those found in hydrolyzed tallow.

References Cited in the file of this patent

UNITED STATES PATENTS

| | | |
|---|---|---|
| 2,293,676 | Myers et al. | Aug. 18, 1942 |
| 2,340,104 | Brown | Jan. 25, 1944 |
| 2,596,344 | Newey et al. | May 13, 1952 |

OTHER REFERENCES

Markley: Fatty Acids, page 582 (1947). Interscience Publishers Inc., New York.

Schlenk et al.: "Science," vol. 112, pages 19–20. July 7, 1950.

Schlenk et al.: J. A. C. S., vol. 72, pages 5001–5004 (November 1950).

Newey et al.: "Industrial and Engineering Chem.," vol. 42, No. 12 (December 1950), pages 2538 to 2541.